United States Patent
Jones et al.

(10) Patent No.: US 10,659,295 B2
(45) Date of Patent: *May 19, 2020

(54) SYSTEMS FOR CONFIGURING AND MANAGING CLASSROOM DEVICES

(71) Applicant: AirWatch, LLC, Atlanta, GA (US)

(72) Inventors: Kevin Jones, Atlanta, GA (US);
Jonathan Spaeth, Atlanta, GA (US);
Adam Rykowski, Alpharetta, GA (US);
Nishita Manjunath, Atlanta, GA (US);
Sai Kiran Vudutala, Atlanta, GA (US);
Ramana Malladi, Atlanta, GA (US);
Abhishek Mishra, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,444

(22) Filed: Aug. 20, 2018

(65) Prior Publication Data
US 2018/0359148 A1 Dec. 13, 2018

Related U.S. Application Data

(63) Continuation of application No. 15/249,444, filed on Aug. 28, 2016, now Pat. No. 10,057,117.

(51) Int. Cl.
| | | |
|---|---|---|
| *H04L 12/24* | (2006.01) | |
| *G06F 8/61* | (2018.01) | |
| *G09B 5/00* | (2006.01) | |
| *G06F 8/60* | (2018.01) | |
| *H04L 12/771* | (2013.01) | |
| *G06Q 20/12* | (2012.01) | |
| *G06Q 50/00* | (2012.01) | |

(52) U.S. Cl.
CPC ........... *H04L 41/0806* (2013.01); *G06F 8/60* (2013.01); *G06F 8/61* (2013.01); *G06Q 20/12* (2013.01); *G06Q 20/1235* (2013.01); *G06Q 50/00* (2013.01); *G09B 5/00* (2013.01); *H04L 41/046* (2013.01); *H04L 41/0893* (2013.01); *H04L 41/22* (2013.01); *H04L 45/563* (2013.01)

(58) Field of Classification Search
CPC ..... H04L 41/08; H04L 41/0806; H04L 41/22; H04L 45/563; G06F 3/0486; G06F 8/60–61; G06F 11/3051; G09B 5/00–14; G06Q 20/12–1235
See application file for complete search history.

(56) References Cited

U.S. PATENT DOCUMENTS 5,742,286 A * 4/1998 Kung ................. G06F 3/0486
715/733
5,870,611 A * 2/1999 London Shrader ....... G06F 8/61
715/866

(Continued)

*Primary Examiner* — Brendan Y Higa
(74) *Attorney, Agent, or Firm* — Clayton, McKay & Bailey, PC (57) ABSTRACT

Systems herein allow an administrator to efficiently set up user devices for use in a classroom environment. A management server can display a graphical user interface that includes selection options for defining and using carts of user devices. The carts can be selected and assigned to classes. The GUI also allows the administrator to specify which applications a class will use. Based on these selections, the management server can then manage which user devices install which applications, and allocate licenses accordingly.

20 Claims, 9 Drawing Sheets

(56) References Cited

U.S. PATENT DOCUMENTS

| | | | |
|---|---|---|---|
| 5,933,647 A | 8/1999 | Aaronberg | |
| 6,948,168 B1 | 9/2005 | Kupriones | |
| 8,671,187 B1* | 3/2014 | Fu | H04L 43/0876 709/224 |
| 9,473,417 B2 | 10/2016 | Reagan | |
| 2004/0088397 A1 | 5/2004 | Becker | |
| 2008/0092133 A1 | 4/2008 | Mantere | |
| 2008/0244681 A1* | 10/2008 | Gossweiler | H04N 21/235 725/133 |
| 2009/0254912 A1 | 10/2009 | Roundtree | |
| 2010/0131084 A1* | 5/2010 | Van Camp | G06F 8/65 700/86 |
| 2012/0032945 A1 | 2/2012 | Dare | |
| 2012/0184349 A1* | 7/2012 | Barclay | G07F 17/3204 463/20 |
| 2012/0303476 A1 | 11/2012 | Kryzanowski | |
| 2013/0111355 A1 | 5/2013 | Jennings | |
| 2013/0224717 A1* | 8/2013 | Thun | G09B 5/00 434/350 |
| 2013/0232229 A1* | 9/2013 | Firman | G06F 8/61 709/219 |
| 2013/0346268 A1* | 12/2013 | Pereira | G06Q 10/10 705/34 |
| 2014/0162595 A1* | 6/2014 | Raleigh | H04L 67/22 455/405 |
| 2015/0317235 A1* | 11/2015 | Lachambre | G06F 11/3668 717/126 |
| 2016/0092887 A1 | 3/2016 | Jagad | |
| 2017/0004447 A1* | 1/2017 | Biswas | G06Q 10/06311 |
| 2017/0353603 A1 | 12/2017 | Grunewald | |

* cited by examiner

SYSTEMS FOR CONFIGURING AND MANAGING CLASSROOM DEVICES

This application is a continuation of U.S. patent application Ser. No. 15/249,444, entitled "SYSTEMS FOR CONFIGURING AND MANAGING CLASSROOM DEVICES," filed Aug. 28, 2016. This application claims priority to U.S. patent application Ser. No. 15/249,444, which is incorporated by reference in its entirety.

BACKGROUND

Educational institutions constantly seek ways to leverage technology to educate their students. This includes using technology to create an interactive learning atmosphere where ideas can be more easily illustrated and shared with students. Recently, systems have been developed for using mobile devices, such as tablets, in a classroom environment. These mobile devices can be shared. For example, a classroom can have a set of tablets that get used by different students in each class. In addition, students can bring their own devices to use in the classroom in some situations.

To effectively use these mobile devices for education, a management system must be put in place. Without proper management tools, the mobile devices can become a distraction and even a means for cheating. For example, students might browse the Internet or access applications that ultimately distract from learning in class. As a result, schools must implement a system for managing the various devices in the classroom.

However, the complexities of implementing the management system can be cumbersome and prevent wide-scale technology adoption. Specifically, current systems can require an administrator to individually install applications on each user device. Schools can have thousands of students and large numbers of different classes. Devices can be shared among the different students and classes. Managing which applications to install on which devices can be a very time consuming and difficult task.

If administrators cannot easily setup devices for classroom use, then schools will not use the systems. For example, if all of the user devices for a given class are not setup with the right applications, files, and management configurations, the teacher can be distracted from educating the students in order to investigate technical issues. Some of the students might not be able to approach the lesson plan as intended. This results in the teacher deciding not to rely on the user devices as a teaching tool. Because of the setup complexities, the educational potential of fully integrated classroom user devices has gone largely unrealized. If the technology can be improved to ease setup burdens, an opportunity exists for enhanced education and widespread adoption of very promising educational technology.

As a result, a need exists to improve the technology for configuring and managing user devices in a classroom.

SUMMARY

An example system for configuring and managing classroom devices can include a management server that communicates with user devices. The management server can also enroll user devices for use in a classroom. The user devices can be tablets, smart phones, laptops, televisions, or any other processor-based device. The user devices can be shared between classes. Some user devices can alternatively be personally owned by the user, such as a student's or teacher's personal tablet.

Before or during enrollment, a management agent can be installed onto the user devices. The management agent can communicate with the management server to allow an administrator or teacher to control functionality of the user devices.

Because a classroom can have many user devices, it can become unwieldy for an administrator to manually set up the applications for each of the user devices. To overcome this entry barrier, the management server can provide tools for setting up groups of user devices at a time. In one example, user devices can be grouped into multiple carts. The carts can help streamline the setup of classroom user devices. In particular, an administrator can focus on selecting which applications and other resources are needed for a class, and the management server can make sure the appropriate resources are allocated.

The system can include a console with a graphical user interface ("GUI") that an administrator can use to manage the setup of user devices. The GUI can include a first selection option for assigning user devices to carts. The GUI can include a second selection option for assigning carts to classes. A first class can utilize one or more carts. A second class can utilize the same or different carts. For example, a single classroom might be used for both math and science classes. The number of students can dictate that different carts are used for each class.

The GUI can also include a third selection option for assigning applications and other resources to classes. The teacher need not assign applications directly to user devices, even though the management server ultimately manages devices in that way.

Based on the first, second, and third selections, the management server can ensure proper allocation of application licenses to user devices. In one example, the management server can determine if the appropriate license allocations exist before assigning the applications to the applicable user devices. In another example, the management server can stage the applications on the assigned user devices, but wait until licenses become available to allocate licenses to those devices. The management server can also minimize the chances of duplicate licenses being assigned to the same user device or to a user device that will not use the licenses.

Although the administrator can use the carts in the GUI for efficient management, the management server can track which resources are allocated to which user devices in a direct relationship. For example, each device can be directly linked to one or more application licenses in a table. When the administrator moves carts to another class or assigns different applications or management configurations to a class, the management server can update the device-to-application relationships with a backend process. This use of carts allows the administrator to avoid complications involved in the device-to-application management, while allowing the management server to make intelligent management decisions based on the administrator selections.

In one example, the management server can cause the user devices to make calls to install the applications that have been selected for that class. In one example, the applications are staged on the user devices until the licenses are available for use. Then, based on license allocation, the applications can be used in the classroom on the applicable user devices.

It is to be understood that both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described here include systems for setting up user devices for classroom use. An enterprise mobility management ("EMM") system can enroll and manage the user devices. Unlike current systems, an example EMM system can group devices according to carts. Using a console GUI, an administrator can assign one or more carts to a class. The administrator does not need to know the specific device identifiers for the user devices in the carts. By utilizing carts instead of individual user devices, the administrator can more easily setup the user devices for use in the classroom, leading to higher usage and adoption of the classroom technology.

To set up the devices, the GUI can also allow the administrator to assign applications to classes. This can also include assigning applications by grade, which can assign applications to all classes in the grade. Because backend processes at the management server track which user devices are assigned to each class based on the carts, the management server is able to schedule license allocation for the applicable user devices without further complication to the administrator. Similarly, if more devices are needed in a class, the administrator can assign an additional cart to the class. The backend process can then manage installation of applications and license allocation for the additional cart of user devices.

The management server can also allocate files and other resources based on cart assignments to classes. This can ensure that the user devices are equipped for the class session when the class begins. Teachers can focus on teaching rather than setting up or otherwise managing user devices during class.

Figure 1:
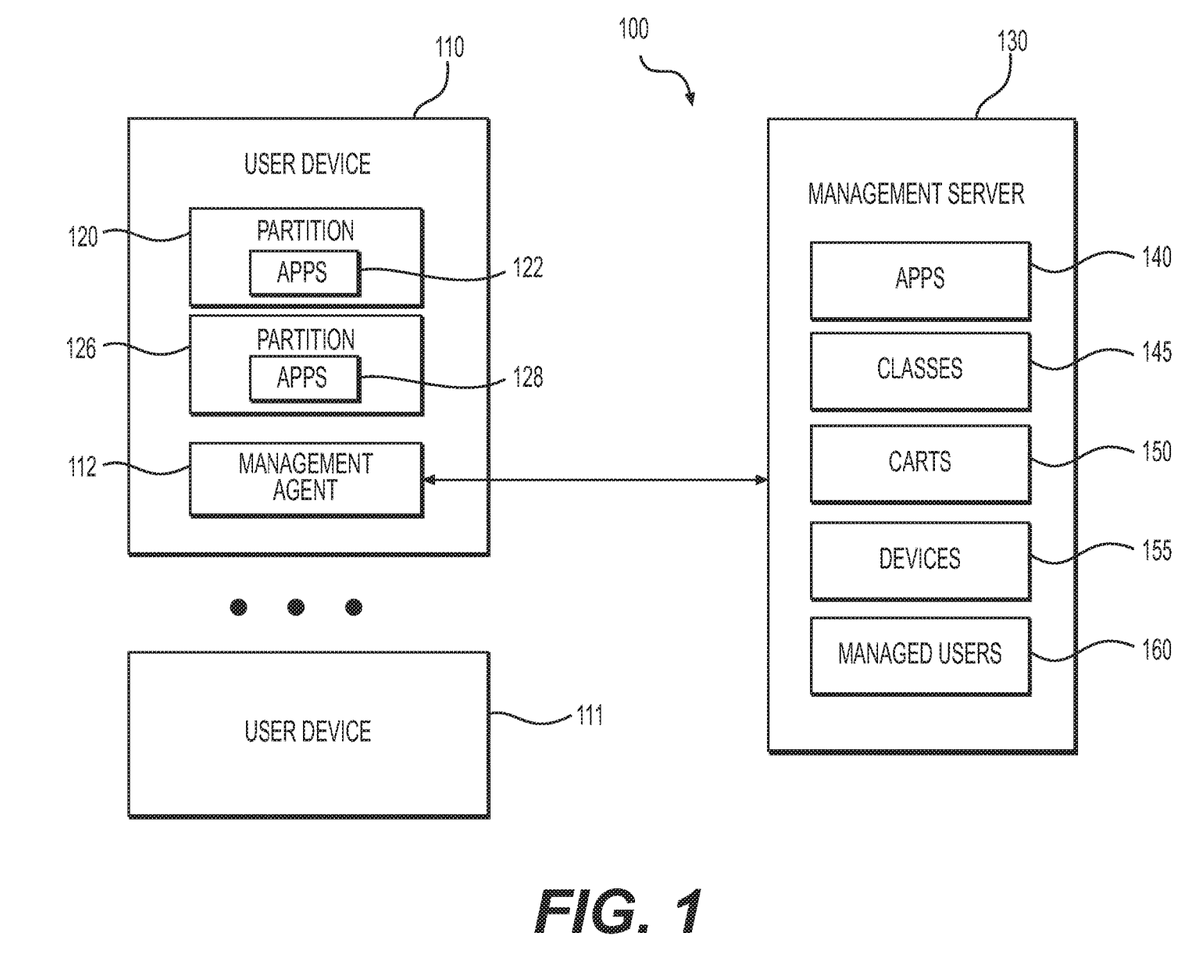
FIG. 1 is an exemplary illustration of system components.

FIG. 1 illustrates an exemplary system 100 for classroom user devices. Each class 145 can be associated with multiple user devices 110 and 111. A user device 110 or 111 can be assigned to either a student or a teacher in an example. User devices 110 and 111 can be any computing device, such as a cell phone, laptop, tablet, personal computer, workstation, television, or television receiver. Each can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others. User devices 110, 111 and management server 130 can communicate wirelessly.

The user devices 110 and 111 can execute managed applications 122 and 128 that are installed for use in the classroom environment. The managed applications 122 and 128 can be specific to one or more subjects, such as a calculator for math and science. Alternatively, an application 122 or 128 can be a general application, such as a word processor. In one example, by managing the applications 122 or 128, classroom-related files can be isolated from personal files stored on the user device 110 or 111, as will be further described.

In one example, the management server 130 is located remotely, such as on a cloud-hosted environment, from the user devices 110 and 111, although the management server 130 can also be on the premise of the educational institution. User devices 110 and 111 can enroll with the management server 130 to be configured for classroom use. In one example, a management agent 112 is downloaded from the management server 130 and installed during enrollment. In another example, the management agent 112 is part of or provided with the operating system of the user device 110, and exists on the user device 110 prior to enrollment. After enrollment, the management server 130 can send messages to the management agent 112 to control certain functions on the user device 110.

An administrator can use a console at the management server 130 to control aspects of classroom integration on a user device 110. In one example, the administrator can use a GUI to set various management options on the user devices 110.

In one example, an administrator can assign user devices 110 and 111 to carts 150. Carts 150 can be used to group user devices 110 and 111 together so that an administrator can make changes to a set of user devices 110 and 111 that are all used in a class 145. A cart can include a collection of user device 155 identifiers, with the user device 155 identifiers corresponding to physical user devices 110 and 111 that are available in a classroom. For example, a first user device 110 and several other user devices can belong to a first cart 150. A second user device 111 and still other user devices can belong to a second cart 150. The carts 150 can act as a helpful construct so that an administrator can add or remove groups of user devices 110 and 111 to and from classes 145 without having to deal with individual user device 155 identifiers.

In one example, a list of user device 155 identifiers can be imported into the management server 130. Each of the user device 155 identifiers can correspond to a physical user device 110. The user devices 110 and 111 can include identifiers that can be stored in a registry or in a computer information interface. Alternatively, the device identifier 155 can be a serial number that is affixed to the user device 110. A list of user device 155 identifiers can be compiled and uploaded to the management server 130. For example, using the GUI, the administrator can upload a data object containing user device 155 identifiers for processing at the management server 130. The data object can be an electronic spreadsheet, extensible markup language ("XML") file, or comma separated values ("CSV") file, among other things.

The administrator can create carts 150 based on physical collections of user devices 110 and 111. For example, a school can provide physical carts of user devices 110 and 111 that can be placed in various classrooms.

In one example, the user devices 110 and 111 can be shared by different students in different classes 145 that are held in a classroom. During or after enrollment, the administrator can set a cart 150 or individual user device 110 to be shared by selecting an option in the console. Additionally, the administrator can select how many users can share the user device 110. The administrator can use a GUI to select a cart 150, in which case all of the user devices 155 belonging to the cart 150 can be set at once.

One sharing parameter that the administrator can set is a maximum number of users. The maximum number of users can specify how many different users can have their user data cached locally on the user device 110. User data can include applications, application configurations, documents, user profile information, management information that impacts device functionality, and other user-specific information.

In one example, based on the selected maximum number of users, the user device 110 can be formatted to contain separate logical or physical partitions 120 and 126 for separate users. The management agent 112 can cause the user device 110 to provide the specified number of partitions on the user device 110, setting aside storage space for user data for each of the maximum number of users. User data for different users can be cached locally in different partitions. In an example, a first user can configure a first application 122 and a first configuration can be stored in the first partition 120. A second user can configure the same first application 122 or a different second application 128, and a second configuration can be stored in a second partition 126. When the first user logs into the user device 110 for math class 145, the first application 122 can be available with the first configuration without the user device 110 needing to download further information from the management server 130. When the math class 145 ends and the second user logs into the user device 110 for another class 145 (such as science or another math class), the second application 128 can be available with the second configuration.

In another example, applications 122 and 128 can reside at a single location on the user device 110, while application configurations and other user data is separately partitioned. This can reduce the storage costs of installing an instance of an application in multiple partitions 120 and 126. A single application 122 shared between multiple users can be allocated a single license in one example.

In one example, user data in the different partitions 120 and 126 is decrypted by the user device 110 based on the management agent 112 determining which user is logged into the user device 110. The management agent 112 can ensure that the first user cannot access the second user's data.

Classes 145 can be defined at the management server 130 as collections of users 160, such as students and teachers. Classes 145 can also be stored with attributes, such as course subject, grade level, honors designation, and other distinguishing features. These other attributes can be used by an administrator to select multiple classes 145 at once at the management server 130.

Different applications 122 and 128 can be installed for different classes 145. Using the GUI, the administrator can directly select one or more classes 145. The administrator alternatively can indirectly select multiple classes 145 by selecting a grade or a school, which can include a collection of different classes 145. The administrator can then select which applications 140 to install for these classes 145.

The management server 130 can determine which user device 155 identifiers to associate with the applications 140 based on which carts 150 are associated with the selected classes 145. Then the management server 130 can update a database to directly associate each user device identifier 155 implicated by the carts 150 with application identifiers for the selected applications 140.

The applications 140 can be downloaded to the user devices 110 and 111 associated with the user device 155 identifiers. In one example, the management server 130 sends a message to the user devices 110 and 111 regarding the download. The management agent 112 can cause the user devices 110 and 111 to respond by contacting the management server 130 to download and install the applications 140.

In one example, the user devices 110 and 111 download and stage the applications 140. For example, the applications 122 and 128 can be installed locally but not be made useable until licensing provisioning is made. This can allow the management server 130 to prioritize its available pool of application licenses. When it allocates a license to the user device 110, the application 122 can already exist locally and be useable. This can prevent a crush of application 140 downloads when an entire cart 150 of user devices 110 and 111 is assigned licenses, and ensures that the applications 122 and 128 will be ready for use when a class begins.

In one example, the first and second user devices 110 and 111 can communicate with one another through the management agent 112 on each device 110 and 111. These communications can occur over a network that is accessible within or outside of a classroom. The network can include a local area network, but can also include the Internet or any other suitable communication platform. The network can also be an enterprise network in one example. The user devices 110 and 111 can communicate over the network using one or more modulators, demodulators, multiplexers, demultiplexers, network communication devices, wireless devices, antennas, modems, and any other type of device configured to enable data communication through a communication network.

In one example, a student can send media to a teacher or another student over the local network, as allowed by a management profile for the class. The management profile can be setup at the console in advance of the class, and the user devices 110 and 111 can be preconfigured by the management server 130 based on the management profile. The first user device 110 can communicate with the second user device 111 using a peer-to-peer connection without relying on Internet bandwidth. However, in some examples, communication can involve routing media over LAN or Internet connections.

Using the management agent 112 executing on the first user device 110, a management server 130 can interact with and control functionality of the managed applications 122 and 128. Managed applications can cause a user device 110 or 111 to communicate over a network with the management server 130 to securely access files and receive management-related instructions. For example, the management server 130 can lock the user device 110 into a managed application and determine what functionality or files are accessible within the applications. This can also allow a student to use their own user device 110, such as a cell phone, in a classroom environment where classroom-related files can be accessed by communicating with the management server 130.

The management agent 112 can be a portion of an operating system for the user device 110, or it can operate in the application layer of the user device 110. The management agent 112 can include a device-level component. Device-level components can include an application programming interface ("API"), agent application, hypervisor, or virtualized device. The management agent 112 can also include an application-level component. The application-level component can include an API, SDK, application wrapper, or workspace agent application. The device-level management agent can include system level privileges. The application-level management agent can include privileges in managed applications, which can be developed for operation with the management server 130. Reference to the management agent 112 is understood to include either or both of the device-level and application-level components unless otherwise specified.

The management server 130 can interact with the management agent 112 with application-level calls to the application or device-level calls to the operating system of the first user device 110. In one example, based on a permissions control for a portion of a presentation or slides file, the management server 130 can turn functionality on and off within the managed applications through calling subroutines in the management agent 112. If a permission control specifies it, the management server 130 can turn off functionality at the user device 110, such as printing, emailing, or Internet access. This can allow for added security when viewing or editing particularly sensitive portions of a presentation or slides file.

The management server 130 can utilize the management agent 112 to install, disable, or uninstall the managed applications 122 and 128. The management server 130 can automatically disable, delete, or uninstall user data including applications 122 at the user device 110 if a compliance breach is detected. This can help prevent cheating in the classroom. Alternatively, if the user device 110 is lost or the school term ends, the management server 130 can cause the user device 110 to remove user data and remotely lock the user device 110.

In one example, the management server 130 communicates with the management agent 130 through a third-party messaging server that is configured to communicate with the operating system of the user device 110. The management server 130 and messaging server can exchange key pairs to allow for encrypted and secure communication between the servers. The management server 130 and messaging server can swap keys during device enrollment in one example.

In one example, the management agent 112 ensures that the user device 110 is in compliance with compliance rules set at the management server 130. If the user device is not in compliance, the management agent 112 can cause the user device to lock certain functionality or wipe user data.

A compliance rule can set forth one or more conditions that must be satisfied in order for a user device 110 to be deemed compliant. If compliance is broken, the management server 130 can take steps to control access of the user device 110 to enterprise files, applications, and email. Compliance rules can be assigned differently to the different user groups. For example, a teacher group can be assigned different compliance rules than a student group. The teacher group might be allowed to install different applications than the student group. Similarly, the management server 130 can assign different compliance rules based on the different grade levels of students or different geographic school locations. In one example, the different user groups can be defined as different functional groups at the management server 130, which will be discussed below.

The determination of whether a user device 110 is compliant can be made by the management server 130, the user device 110, or a combination of both. For example, the management agent 112 on the user device 110 can generate a data object that describes the state of the user device 110, including any settings, parameters, applications, or other information regarding the state of the user device 110. The data object can be analyzed by the management server 130 or the user device 110 to determine whether the user device 110 is in compliance with compliance rules. In the case of the user device 110 analyzing compliance, a management agent 112 installed on the user device 110 can make the comparison between the data object and compliance rules.

In some examples, a compliance rule can specify one or more conditions. If a condition occurs, the system can react accordingly. For example, the management server 130 can automatically perform one or more remedial actions. In another example, the management server 130 can prompt an administrator to take one or more remedial actions. In some cases, remedial actions can be staged, such that the user of a user device 110 is provided with a chance to remedy their noncompliance before being subjected to stricter remedial actions.

The management server 130 can also communicate with the management agent 112 to set permissions within the managed application 122. This can include restricting which files or applications the user can access, or managing how long the access or use will last. The permissions can be locally stored as part of a user profile in a partition 120 on the user device 110. This can allow a user to use the same user device 110 without needing to reconnect to the management server 130.

In one example, the management server 130 can configure a user device 111 with different functionality based on the user device's 111 user group. For example, a user group can exist for teachers. The teacher's user device 111 can also be configured based on a management agent 112 on the teacher's user device 111. The teacher can be a managed user 160 with a user profile at the management server 130. Based on the classes 145 to which the teacher is assigned, the management server 130 can determine which applications 140 to install at the teacher user device 111. Because a teacher can teach multiple classes 145 that span multiple carts 150 of user devices 155, the teacher device can be updated based on application assignment changes across multiple carts 150.

The management server 130 can, for example, control user devices 110 and 111 based on user groups. A user group can be a collection of users 160 stored at the management server 130 that have similar access levels. A class can have multiple user groups within the class, allowing a teacher to restrict access to test answers to those users in a group that have already taken the test. The teacher or administrator can create user groups and move students between various user groups in an example.

User groups can define groups of users, or groups of user devices 110, that are intended to receive a particular feature set. A user group can be defined using any relevant criteria, including a type of user, a type of device, a location of the device, or a school associated with the device, for example. A user device 110 can belong to any number of functional user groups. For example, a user device 110 can belong to a user group associated with $6^{th}$ grade students, as well as a user group associated with the math club. The math club user group could be used to turn on or off particular device functionality at particular times or locations, such as at club events or meets. For example, during a math event, a specialized graphing calculator with controlled limited functions could be enabled, whereas access to the Internet and other applications could be disabled. The math club user group could also provide access to additional applications 140, such as an advanced calculator that is not part of the student's normal math class package.

In this way, user groups can be an additional factor (for example, in addition to carts) used by the management server to determine which user devices 110 receive a feature set. The additional feature set can be stored locally as part of user data in a partition 120 of the user device 110 that is associated with the user. When an administrator builds a feature set, he or she can select one or more user groups to receive that feature set. A feature set can be sent to a single user group or to multiple user groups. The management server 130 can determine whether a user device 110 belongs to a selected user group before transmitting a feature set to that user device 110.

The management server 130 can include one or more servers. Each server can include one or more processors that execute instructions stored on a non-transitory, computer-readable medium. The management server 130 can include any number of servers and processors.

The user devices 110 and 111 and management server 130 can each utilize one or more processors. The term "processor," as generally used herein, can refer to any logic processing unit, such as one or more central processing units ("CPUs"), digital signal processors ("DSPs"), application specific integrated circuits ("ASICs"), field programmable gate arrays ("FPGAs"), and similar devices. The processor can include one or more processors configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The user devices 110 and 111 and management server 130 can also include an I/O module, such as a console with an integrated keyboard and mouse to allow a user to input parameters associated with system 100. An I/O module can also include a display including a GUI for outputting information on a screen.

Although an example has been described where the applications 140 are managed, the applications 140 can also be unmanaged applications. The management server 130 can still control access to those applications 140 by selectively installing and allocating licenses for those applications 140 based on cart 150 assignments to classes 145. Alternatively, applications 140 can be developed to include the described management agent 112 functionality or to interface with the management agent 112 functionality of the operating system.

Figure 2A:
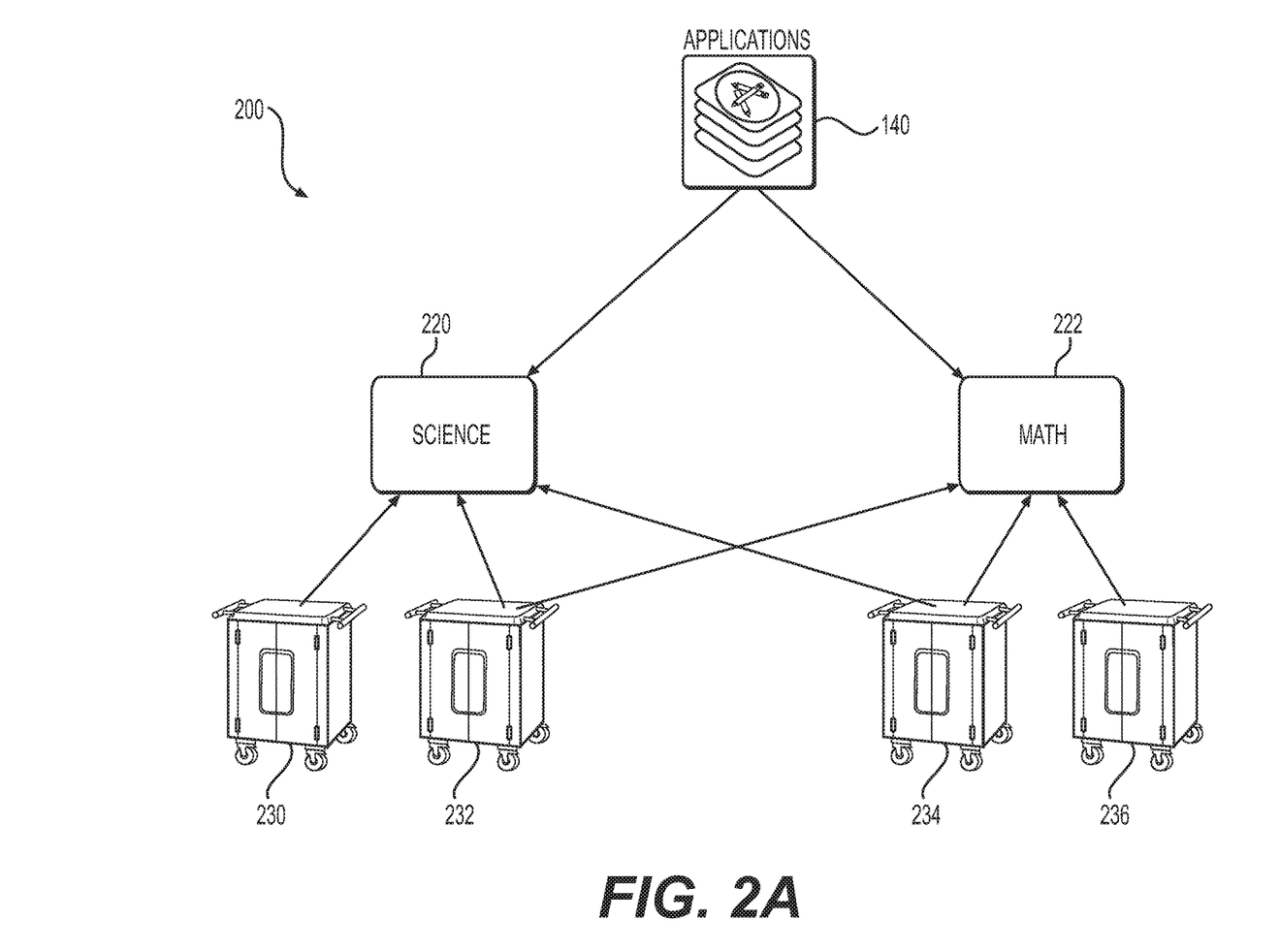
FIG. 2A is an exemplary graph of relationships between applications, classes, and carts in a system.

FIG. 2A is an exemplary illustration of relationships 200 between applications 140, classes 145, and carts 150. As illustrated, a science class 220 can utilize first cart 230, second cart 232, and third cart 234. These three carts 230, 232, 234 can each be assigned to the science class 220 by an administrator using the GUI of the management server 130 console. The GUI can present an option to select a class, and the administrator can select science class 220. Then, the GUI can prompt the administrator to assign carts 150 to the class 220. In response, the administrator can select the first three carts 230, 232, and 234. These carts 230, 232, and 234 can be associated with numerous user devices 110 and 111 that can be physically delivered to the classroom where the science class 220 is held. Similarly, carts 232, 234, and 236 can be assigned to a math class 222.

Rather than worrying about which user devices 155 are in a class 220 or 222, the administrator need only assign applications 140 to the classes 220 and 222 with the console GUI. Then, a backend process at the management server 130 can determine which user devices 155 need which applications 140. These applications can be downloaded onto the user devices 155. Licenses can also be allocated based on available licenses for each application and estimated usage times.

In one implementation, a cart 230 can correspond to a physical bin of user devices 155 at the school. When the bin is needed in another class or classroom, an administrator can use the console to change the cart 150 to be associated with class 145. When a cart 150 is removed from a class 145, the teacher of the class 145 can be notified on their user device 111 by the management server 130.

In one example, the management server 130 can maintain a schedule of carts 150 and their relations to classes 145. This can allow the same cart 232 to be used, for example, in a science class 220 and a math class 222 even when those classes 220, 222 are held in different classrooms. As part of the scheduling, the management server 130 can notify a teacher or other user to move the cart 232 to another classroom. For example, when the science class ends 220, the management server 130 can cause a staff member's user device 111 to present a cart delivery notification. The notification can identify the cart 232 (which can be used to identify a serial number on a bin). The notification can also show the cart's 232 current location and the designation classroom, such as where math class 222 will be held. This can allow a school to maximize its resources by physically moving bins of user devices 155 (corresponding to carts 150) to locations where they are needed and already equipped for use.

Similarly, the management server 130 can allocate and deallocate licenses according to class schedules. As an example, licenses to applications 140 can be allocated to a first cart 230 for science class 220. But when science class 220 is over, the same licenses might be needed for a fourth cart 236 for a math class 222. The management server 130 can schedule allocation such that licenses are deallocated from user devices 155 associated with the first cart 230 and reallocated to the user devices 155 of the fourth cart 236.

Figure 2B:
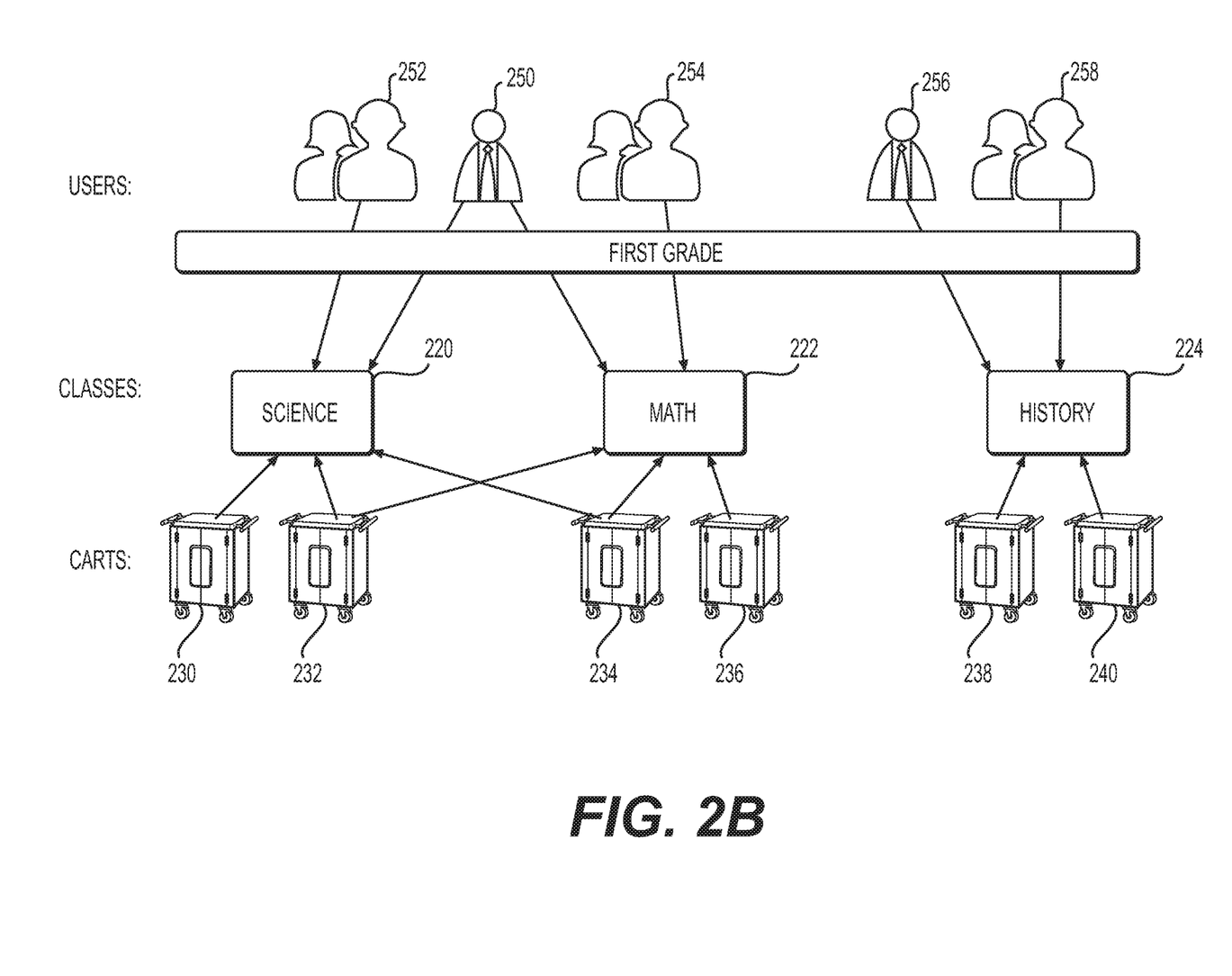
FIG. 2B is an exemplary graph of relationships between users, classes, and carts in a system.

FIG. 2B provides a further example of the relationship between users 160, classes 145, and carts 150. As shown in FIG. 2B, a first teacher 250 can be an instructor for both the science 220 and math classes 222. The first four carts 230, 232, 234, and 236 can all correspond to bins that exist in the first teacher's 250 classroom. However, the allocation of application 140 licenses can vary between the carts 230, 232, 234, and 236 as explained with regard to FIG. 2A. Because the first students 252 in the science class 220 can be overlapping but different than second students 254 in the math class 222, multiple carts 230, 232, 234, and 236 of user devices 155 can allow for efficient use of resources. For example, the first students 252 that have the science class 220 but not the math class 222 can login to devices in the first cart 330. This can spare application 140 license allocations associated with the math 222 class. However, the first students 252 that are also part of the group of second students 254 in the math class 222 can login to user devices 155 in either the second or third carts 232 or 234, which can have application 140 license allocations for both classes 220 and 222. Second students 254 who are only in the math class 222 can login to user devices 155 in the fourth cart 236.

As illustrated, a second teacher 256 can instruct in a non-related class, such as history 224. This class 224 can have fifth and sixth carts 238 and 240 that have a different set of applications 140 installed on them relative to the other carts 230, 232, 234, and 236. A third group of students 258 can share the user devices 155 associated with the fifth and sixth carts 238 and 240.

In one example, a cart 234 can be assigned to a grade by the administrator. This cart 234 can then be assigned to all classes that are in the grade. Applications 140 from each class can be staged on the collection of user devices 155 associated with the cart 234. This can be useful when extra user devices 150 are needed in a classroom; for example, if an additional student attends the class or if a user device 110 stops functioning correctly. In another example, the cart 234 can be used for loaner user devices 110 and 111 that a student of that grade level can check out from the school for remote study. This can allow a student at a remote location to participate in class activities, in an example.

In still another example, a cart 232 can be assigned to one or more teachers. The teachers can be part of a user group defined at the management server 130. In one example, teachers can be grouped according to grade. In another example, teachers can be grouped according to subject. Assigning at least one cart to a teacher group can ensure that an appropriately equipped user device 111 is available for a substitute teacher or in the event that a teacher's user device fails.

Figure 3:
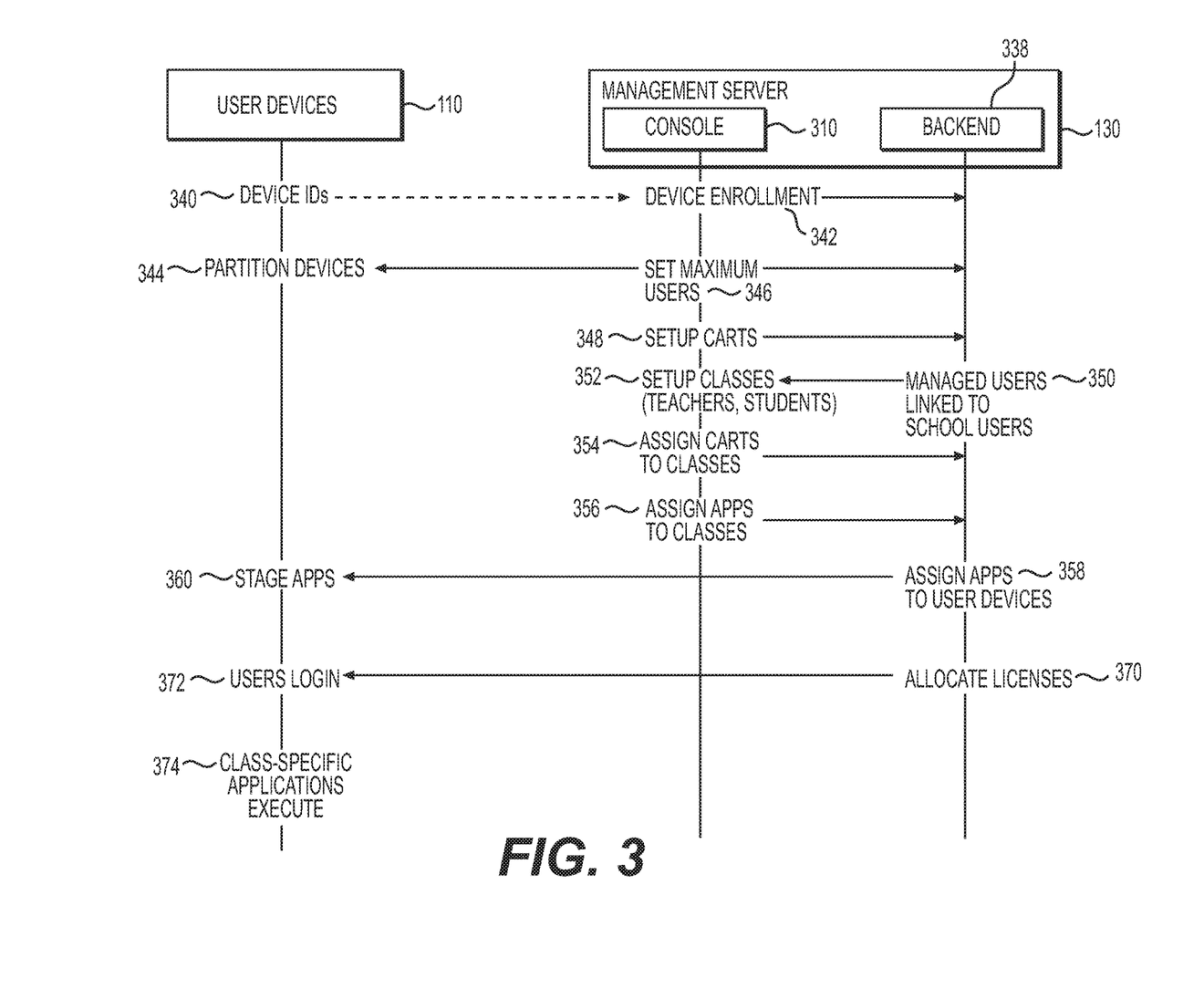
FIG. 3 is an exemplary flow chart of steps performed in a system.

FIG. 3 is an exemplary flow chart of stages performed in a system. In one example, device identifiers associated with the user devices 110 are uploaded to the management server at stage 340. To do this in bulk, a list of device identifiers can be copied from the user devices 110 into a file, such as a CSV file. The file can be uploaded to the management server 130, which can load the user devices 110 into the backend 338 portion of the system, such as in a database. This can occur before the user devices 110 are enrolled in one example. In another example, QR codes can be placed on each device, and the device can be scanned to provide device identifiers to the management server.

At stage 342, management server 130 can enroll user devices 110 into an EMM system. The EMM system provides management capabilities to the management server 130 and configures the user devices 110 for use in a classroom setting.

As part of this configuration, at stage 346, the administrator can use the console 310 to set maximum users on the user devices 110. This can cause the management server 130 to configure the user devices 110 to locally cache user data for the selected maximum number of users. In one example, at stage 344, the management agent 112 of the user devices 110 causes the user device 110 to create a number of logical or physical partitions 120 equal to the selected maximum number of users. Each partition 120 can store a different user's data. In one example, the management agent 112 prevents a user from accessing user data that is not in their designated partition 120.

At stage 348, before or after enrollment, the administrator can use the console 310 to set up carts 150. Using the console GUI, the administrator can select which of the multiple user devices 110 to assign to a cart 150. In one example, the GUI allows the administrator to select a file containing user device 155 identifiers to associate with the carts 150. The management server 130 can import the file and link the cart 150 to the listed user devices 155. In another example, the file being imported can specify both carts 150 and user devices 155, so that the device-to-cart associations are loaded automatically into the management server 130. The administrator can also use the GUI to move user devices 110 between different carts 150 in an example.

At stage 352, the administrator can use the console GUI to set up classes 145. The administrator can assign managed users 160, such as teachers and students, to the classes 145. As part of this process, at stage 350, managed users 160 can be linked to school users. For example, a list of students and teachers can be mapped to managed users 160 by comparing names and email addresses. In another example, the administrator can use the GUI to map users that are not automatically linked.

Managed users 160 can have user profiles that are stored at the management server 130. The user profiles can specify different access levels and available functionality between users. For example, if a student misuses an application, the administrator can change the permissions of that managed user 160 to disable some functionality in the application. This user information can be downloaded and cached locally in a user device 110 that the managed user 160 has previously logged into.

At stage 354, the administrator can use the console 310 GUI to assign carts 150 to classes 145. The administrator can select a class 145, then select one or more carts 150 to assign to the class 145. In one example, the administrator can select multiple classes 145 at once, allowing carts 150 to be simultaneously assigned to multiple classes 145. Based on administrator input at stage 352, classes 145 can be associated with grade levels, subjects, or teachers in one example. This can allow an administrator to select multiple classes 145 by selecting a single grade level, subject, or teacher. Selecting one or more of these group indicators can implicate a set of corresponding classes 145. The administrator can then select one or more carts 150 that will apply to all of the selected classes 145.

At stage 356, the administrator can similarly use the console 310 GUI to assign applications 140 to classes 145. The administrator can select one or more classes 145 as described with regard to stage 354. Then the administrator can use the console 310 GUI to select one or more applications 140 to assign to those classes 145. In one example, the administrator can select a group of applications 140. For example, applications 140 can be grouped by subject matter or suites of applications 140 that are typically used together.

At stage 358, after the administrator has made the above selections, the direct association of applications 140 to user devices 155 is handled by a backend process 338 of the management server 130. By using the console 310 GUI to assign carts 150 to classes 145 and applications 140 to classes 145, the administrator is able to specify which user devices 155 will receive which applications 140 without having to determine or specify any individual user devices 155. As carts 150 are moved in and out of classes 145, the management server 130 backend processes 338 can automatically associate the correct user devices 155 with the correct applications 140. Using carts 150 in this way can save an administrator time in setting up the relationships between applications 140 and user devices 155. The setup-time savings makes a school much more likely to use the technology in a classroom environment.

The association of applications 140 to user devices 155 at stage 358 can be part of an ongoing backend process 338. The backend process 338 can be triggered when an administrator changes a cart-to-class assignment, or an application-to-class assignment. This can allow the administrator to freely move carts 150 or applications 140 while the management server 130 constantly adjusts application-to-device deployment.

Based on the application-to-device assignments, at stage 360, the management server 130 can cause the user devices 110 to stage an application 140. The management server 130 can send a message the management agent 112, causing the user devices 110 to download the application 140 from the management server 130 or an application store. The application 140 can exist on the user devices 110 prior to license allocation so the user devices 110 will be ready for use.

At stage 370, the management server 130 can allocate application 140 licenses to the user devices 110. License allocation can be managed by the management server 130 to minimize the number of licenses needed. In one example, this includes allocating licenses only to those user devices 155 that have been assigned the application 140 by the management server at stage 358. In another example, allocation of licenses can be scheduled so that particular applications 140 are only licensed when use is imminent. This can be done based on a class schedule stored at the management server 130.

At stage 372, a user can login to the user device 110. The user device 110 can display a picture of the user by determining which class 145 is in session and which managed user 160 logged into the device for that class 145 previously. The user device 110 can be configured for operation based on user data stored locally in a partition 120. The relevant applications 122 can be ready for execution based on prior staging (stage 360) and license allocation (stage 370).

Therefore, at stage 374, the user can execute the applications 140 assigned to that user device 110 according to a managed configuration for the user.

Figure 4A:
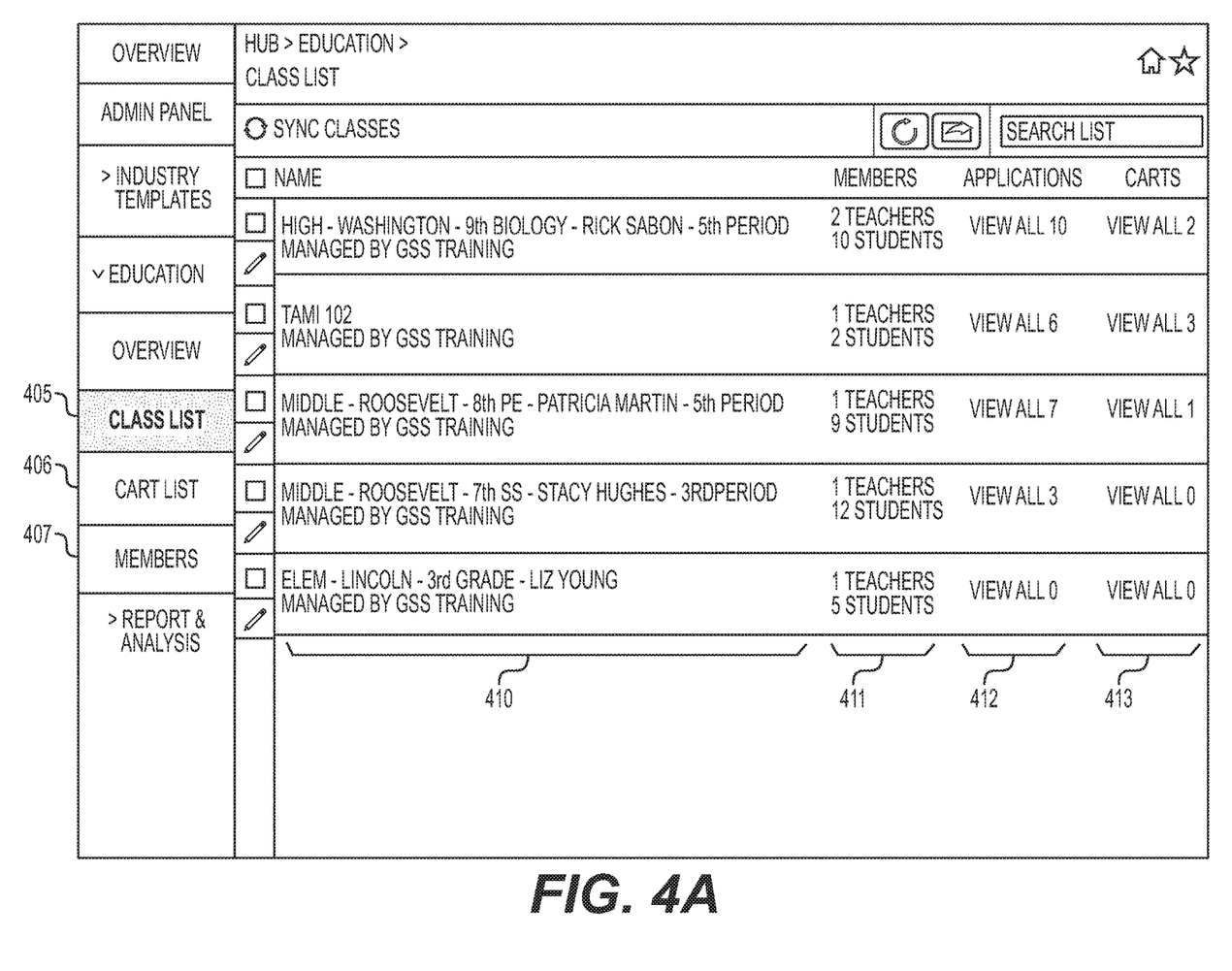
FIG. 4A is an exemplary illustration of a graphical user interface.
Figure 4B:
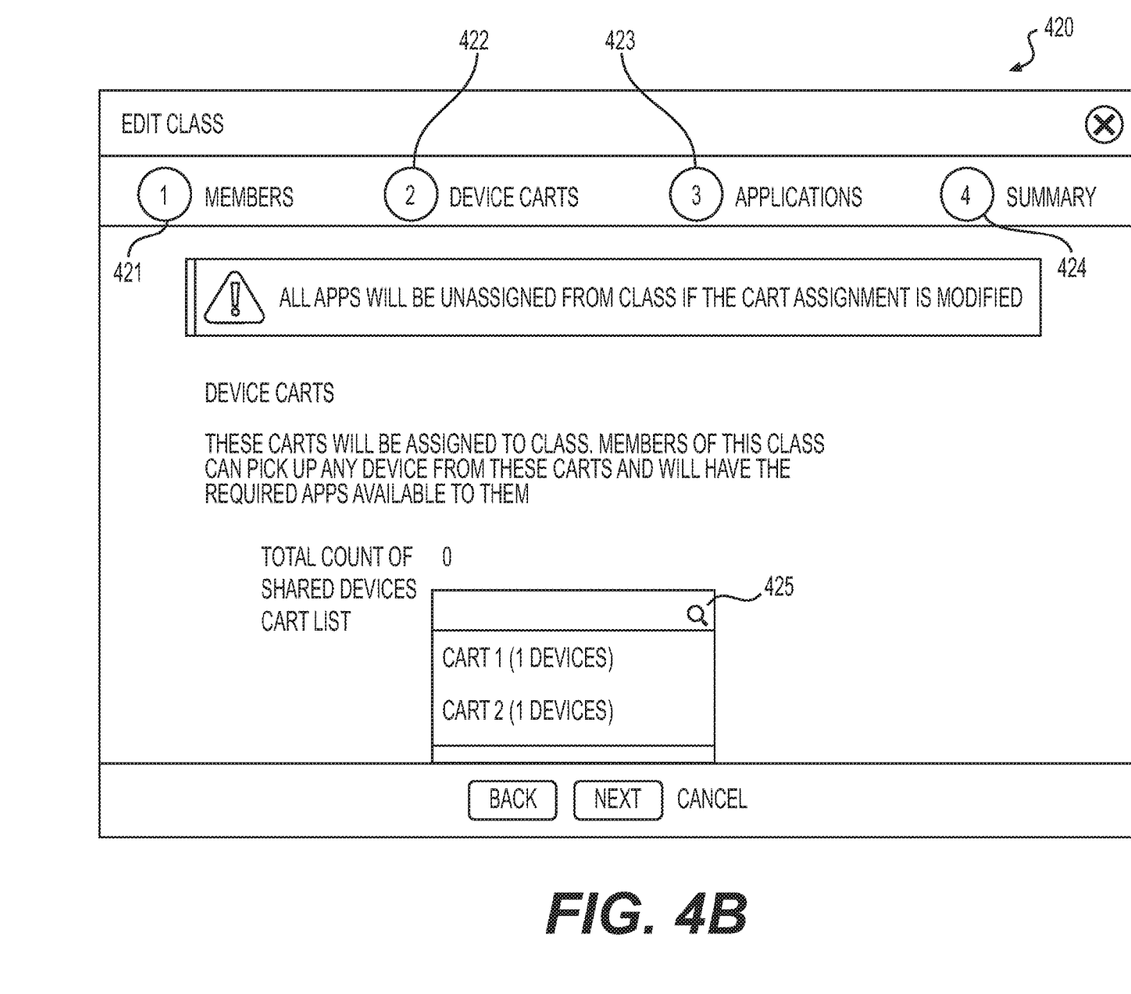
FIG. 4B is an exemplary illustration of a graphical user interface.
Figure 4C:
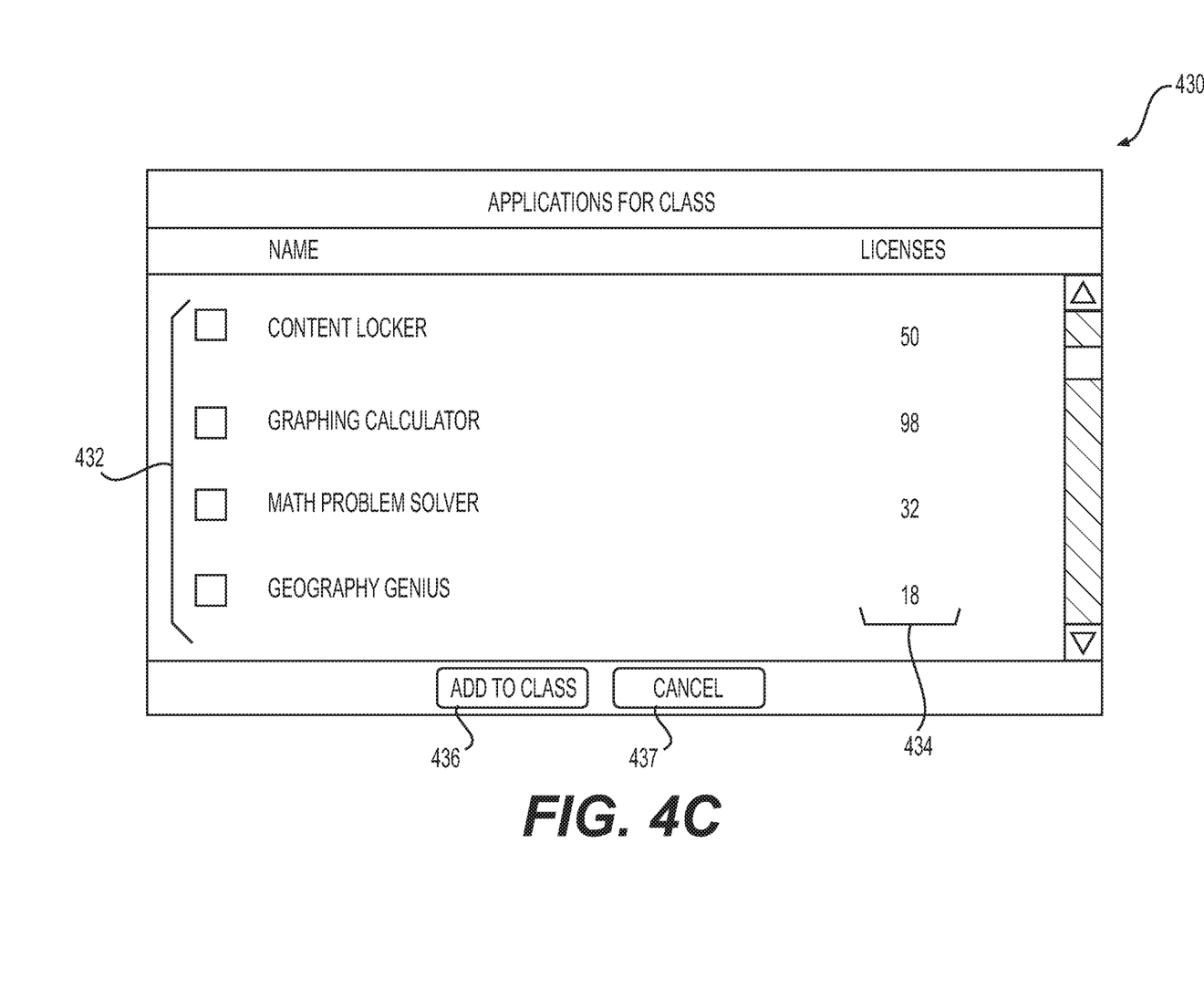
FIG. 4C is an exemplary illustration of a graphical user interface.
Figure 4D:
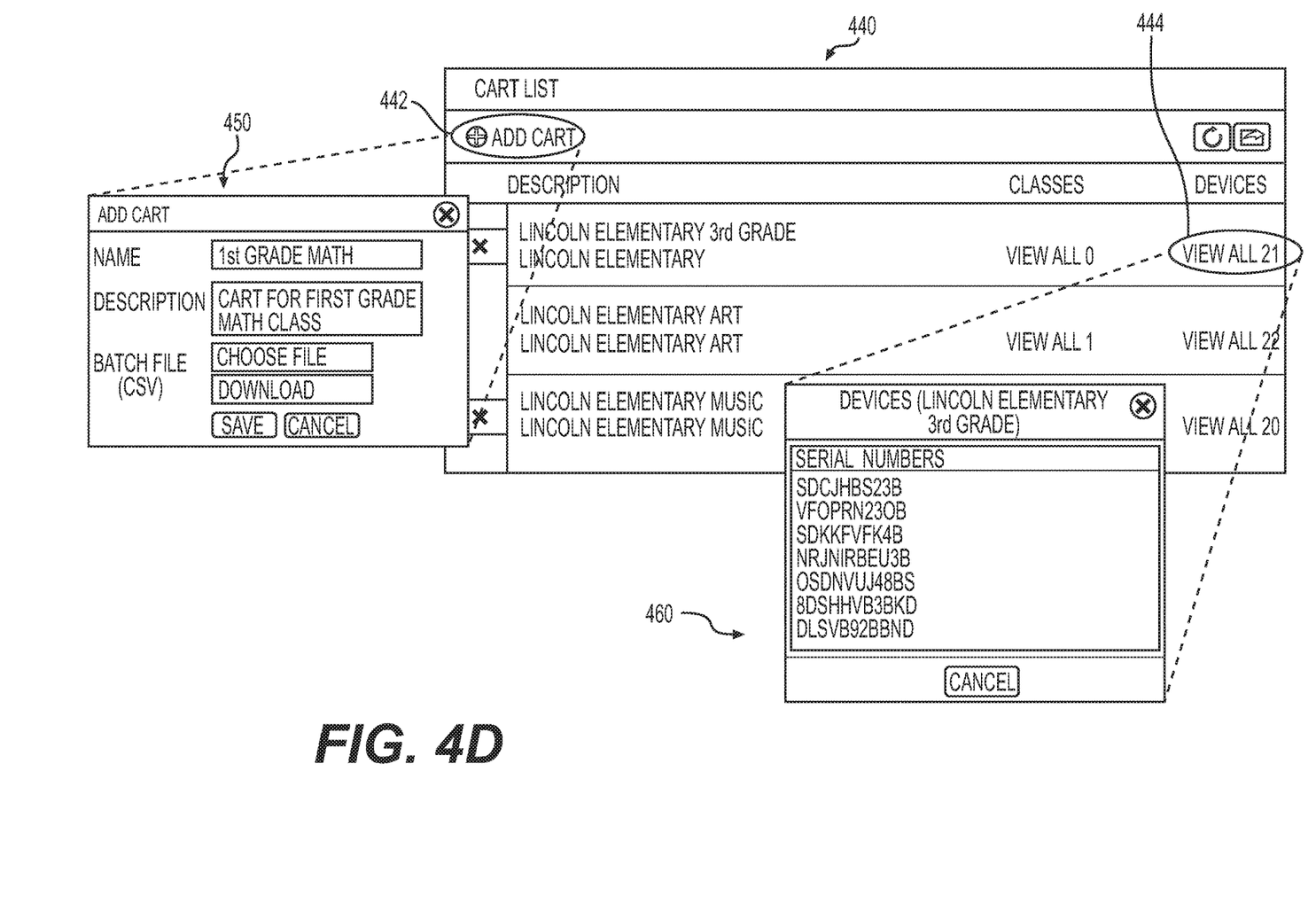
FIG. 4D is an exemplary illustration of a graphical user interface.

FIGS. 4A, 4B, 4C, and 4D present example GUI screens for the console 310 of the management server 130. These GUI screens provide an example of how an administrator can select classes 145 (FIG. 4A), assign carts 150 to classes 145 (FIG. 4B), and assign applications 140 to classes 145 (FIG. 4C). FIG. 4D additionally provides example GUI screens for setting up carts 150.

Turning to FIG. 4A, the administrator can select a first option 405 to view a class list, a second option 406 to view a cart list, or a third option 407 to view managed users. In the example of FIG. 4A, the first option 405 for a class list is selected. The GUI then displays classes 410. In this example, for each class 410, the GUI also lists the number of managed users 411, applications 412, and carts 413 currently assigned to the class 410.

When the user selects one of the classes in the GUI, they can be presented with options to link the class to particular managed users 160, carts 150, and applications 140. An example GUI window 420 for making these selections is shown in FIG. 4B. For the selected class, the administrator can edit members 421, carts 422, or applications 423. The example GUI window 420 includes a selection box 425 for picking carts 413 to associate with the class 410.

Similarly, when the administrator elects to edit applications 423, an application selection screen 430 can be displayed, such as the example GUI window 430 shown in FIG. 4C. The administrator can select between multiple applications 432 to assign to the class 410. In making the selection, the administrator can also be presented with the number of licenses 434 available for each application 432. This can help the administrator determine which applications 432 to assign to the class 410, since the administrator generally will want to preserve licenses for those classes that need them. In one example, the administrator can select applications for a class 410 even when there are too few licenses 434 available. In that case, the management server 130 can cause the user devices 155 associated with that class 410 to download and stage the applications 432. This can prepare the user devices 155 so that they will be ready for use once the licenses are allocated to them.

The administrator can add the selected applications 432 to the class 410 by selecting button 436. Alternatively, the administrator can cancel the transaction with button 437.

FIG. 4D shows an example GUI screen 440 for setting up carts 422. This screen 440 can be generated when the administrator selects option 406 in FIG. 4A. The administrator can be presented with a screen 440 that shows which carts are assigned to classes 410 and user devices 155. This can allow the administrator to locate unused carts 422 or have a clearer picture of the impact of reassigning a cart 422 that is in use by a class 410. An administrator can view the specific classes 410 or user devices 155 associated with the cart 422. For example, an administrator can select link 444, and the user devices 155 associated with the "Lincoln Elementary $3^{rd}$ Grade" cart 422 can be displayed in screen 460. This can allow the administrator to sort out any confusion regarding which cart 422 a particular user device 155 belongs to.

The cart 422 list GUI screen 440 can also provide an option 442 to create a new cart 422. This can cause a second screen 450 to display. This GUI screen 450 can allow the administrator to name the cart 422 and import a batch file of user devices 155 to associate with the cart.

Figure 5:
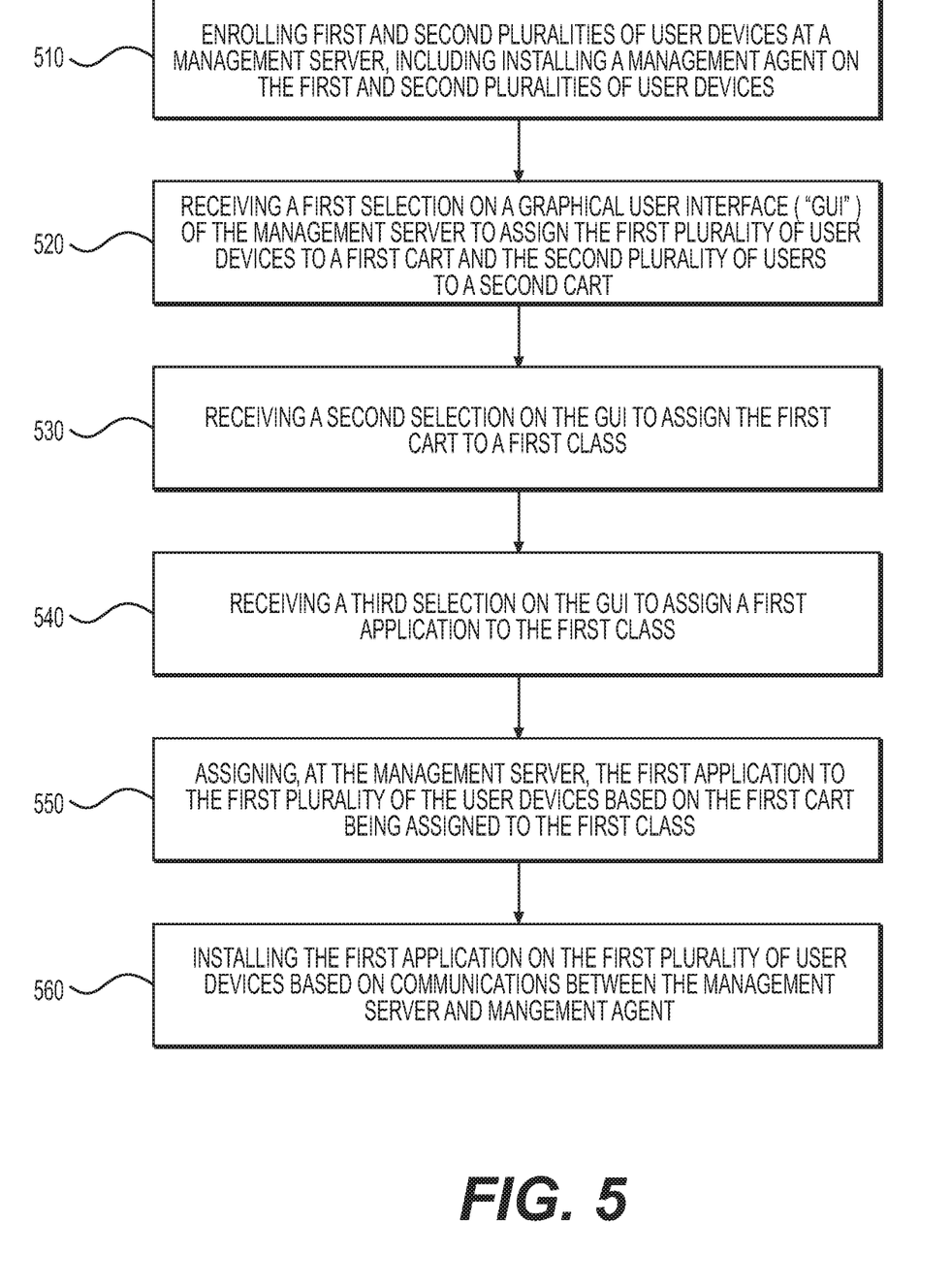
FIG. 5 is an exemplary flow chart of steps performed in a system.

FIG. 5 is an exemplary flow chart for a method performed in an example. At stage 510, the management sever 130 can enroll first and second sets of user devices 155. In one example, the first and second sets of user devices 155 can be enrolled before being divided into groups at the management server 130. Enrollment can include installing a management agent 112 on those user devices 155. It can also include enabling classroom control of the user devices 155. User devices 155 can be enrolled as shared devices or single user devices. For shared devices, the administrator can specify the maximum number of users to locally cache on the user devices 155.

At stage 520, the console 310 GUI can receive a first selection to assign the first set of user devices 155 to a first cart 230. In one example, the administrator uses the GUI to create or select the first cart 230 from multiple carts 150. Then the administrator can select user devices 155 to assign to the first cart 230. This can include selecting a file that contains a list of user device 155 identifiers. In one example, user device 155 identifiers are selectively assigned to the first cart 230 before the enrollment of stage 510 is performed. In another example, the assigned user devices 155 of the first cart 230 are already enrolled.

An administrator can also use the GUI to assign the second set of user devices 155 to a second cart 232. This can include using the GUI to select or create the second cart 232 and assigning additional user devices 150 to the second cart 232.

At stage 530, the GUI can receive a second selection to assign the first cart 230 to a first class 220. This can include selecting a specific class 220 or selecting a group of classes 145 on the GUI. Classes 145 can be grouped according to grade level, subject, or teacher. In one example, the administrator creates classes 145 on the GUI before assigning the first cart 230 to the first class 220. Managed users 160 can be added to the classes 145 using the GUI.

Managed users 160 can be further grouped according to user type, such as student or teacher, and grade level. This can allow the management server 130 to provide different management configurations for different user devices 155 within the first class 145. A teacher 250 can have access to a teacher-specific application 140 that allows the teacher 250 to group and otherwise manage students and their device usage. In one example, a teacher 250 can reward students by elevating them into user groups having access to more applications 140 or functionality within applications 140.

At stage 540, the GUI can receive a third selection to assign a first application 140 to the selected first class 220. This can include selecting a specific application or a group of applications. Applications can be grouped into suites of applications that are typically used together. In one example, the management server 130 recommends one or more applications based on application usage in other classes that are of the same subject or grade level.

Based on those GUI selections, at stage 550 the management server 130 can assign the first application 140 to the first set of user devices 155 (associated with first cart 230). This assignment is driven by the cart including the first set of user devices 155 being assigned to the class 145.

At stage 560, the management server 130 can install the first application 140 on the first set of user devices 155. To do this, the management server 130 can communicate with the management agent 112 that is installed on the user devices 155.

Other examples of the disclosure will be apparent to those skilled in the art from consideration of the specification and practice of the examples disclosed herein. The examples are not limited to a classroom environment, and may be applied to workplace and other environments. The examples can be used to efficiently configure and manage user devices in any learning environment. For example, a corporation can include user devices for training, or can use the examples with an EMM system in the corporation that manages employees' personal user devices. Alternatively, examples can be used in a meeting environment that includes a moderator device and multiple user devices that can act as sender or receiver devices. Likewise, examples can also be utilized by users that are not teachers and students.

Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A non-transitory, computer-readable medium containing instructions executed by at least one processor to perform stages for configuring user devices in a classroom, the stages comprising:
receiving at least one selection on a graphical user interface ("GUI") to:
assign a first plurality of user devices to a first cart and a second plurality of user devices to a second cart;
assign the first cart to a first class; and
assign a first application to the first class;
assigning the first application to the first plurality of user devices based on the first cart being assigned to the first class; and
installing the first application on the first plurality of user devices, including staging the first application on at least one of the first plurality of user devices.

2. The non-transitory, computer-readable medium of claim 1, wherein installing the first application includes staging the first application on the first plurality of user devices, and wherein the stages further comprise allocating licenses to the first plurality of user devices after the first application is staged.

3. The non-transitory, computer-readable medium of claim 1, wherein the stages further comprise:
setting, on the GUI, a maximum number of users; and
partitioning each of the first plurality of devices to cache application data in separate partitions for the maximum number of users.

4. The non-transitory, computer-readable medium of claim 1, the stages further comprising:
enrolling a user device at a management server;
installing a management agent on the user device;
assigning, on the GUI, the user device to the first class; and
causing the management agent to download the first application to the user device based on the user device being assigned to the first class.

5. The non-transitory, computer-readable medium of claim 1, the stages further comprising:
receiving selections on the GUI that assign the first cart to a second class, wherein a memory device associates the second application with the second class;
assigning the second application to the first plurality of user devices based on the first cart being assigned to the second class; and
installing the second application on the first plurality of user devices.

6. The non-transitory, computer-readable medium of claim 5, the stages further comprising:
receiving selections on the GUI that assign the second cart to the second class; and
installing the second application but not the first application on the second plurality of user devices.

7. The non-transitory, computer-readable medium of claim 1, the stages further comprising:
displaying, on the GUI, the number of licenses available for the first application; and
indicating whether the first application can be assigned to the first class based on the licenses available and the number of the first plurality of user devices assigned to the first cart.

8. A method for configuring user devices in a classroom, comprising:
receiving at least one selection on a graphical user interface ("GUI") to:
assign a first plurality of user devices to a first cart and a second plurality of user devices to a second cart;
assign the first cart to a first class; and
assign a first application to the first class;
assigning the first application to the first plurality of user devices based on the first cart being assigned to the first class; and
installing the first application on the first plurality of user devices, including staging the first application on at least one of the first plurality of user devices.

9. The method of claim 8, wherein installing the first application includes staging the first application on the first plurality of user devices, and the method further comprising allocating licenses to the first plurality of user devices after the first application is staged.

10. The method of claim 8, further comprising:
setting, on the GUI, a maximum number of users; and
partitioning the first plurality of devices to cache application data in separate partitions for the maximum number of users.

11. The method of claim 8, further comprising:
enrolling a user device at a management server, the user device ownership being different than the first and second plurality of user devices;
installing a management agent on the user device;
assigning, on the GUI, the user device to the first class; and
causing the management agent to download the first application to the user device based on the user device being assigned to the first class.

12. The method of claim 8, further comprising:
receiving selections on the GUI that assign the first cart to a second class, the management server associating a second application with the second class;
assigning the second application to the first plurality of user devices based on the first cart being assigned to the second class; and
installing the second application on the first plurality of user devices.

13. The method of claim 12, further comprising:
receiving selections on the GUI that assign the second cart to the second class; and
installing the second application but not the first application on the second plurality of user devices.

14. The method of claim 8, further comprising:
displaying, on the GUI, the number of licenses available for the first application; and
indicating whether the first application can be assigned to the first class based on the licenses available and the number of the number of the first plurality of user devices assigned to the first cart.

15. A system for configuring user devices in a classroom, comprising:
a non-transitory, computer readable medium containing instructions; and
a processor that executes the instructions to perform stages comprising:
receiving at least one selection on a graphical user interface ("GUI") to:
assign a first plurality of user devices to a first cart and a second plurality of user devices to a second cart;
assign the first cart to a first class; and
assign a first application to the first class;
assigning the first application to the first plurality of user devices based on the first cart being assigned to the first class; and
installing the first application on the first plurality of user devices, including staging the first application on at least one of the first plurality of user devices.

16. The system of claim 15, wherein installing the first application includes staging the first application on the first plurality of user devices, wherein licenses are allocating to the first plurality of user devices after the first application is staged.

17. The system of claim 15, wherein the stages further comprise an option to set a maximum number of users, causing the first plurality of devices to separately cache application data in separate local partitions, wherein the number of separate local partitions is based on the set maximum number of users.

18. The system of claim 15, further comprising a management server that performs stages including:
enrolling a user device, the user device ownership being different than the first and second plurality of user devices;
installing a management agent on the user device;
assigning the user device to the first class; and
causing the management agent on the user device to download the first application, based on the user device being assigned to the first class.

19. The system of claim 18, wherein the console further receives selections that assign the first cart to a second class, wherein the management server executes further stages including:
associating a second application with the second class;
assigning the second application to the first plurality of user devices based on the first cart being assigned to the second class; and
installing the second application on the first plurality of user devices by communicating with the management agent on the first plurality of devices.

20. The system of claim 15, wherein the GUI receives selections that assign the second cart to the second class, and wherein a management server installs the second application but not the first application on the second plurality of user devices.

* * * * *